Nov. 19, 1968 N. T. EVANS 3,412,397

VIDEO CORRELATOR AND AUTOMATIC DETECTOR FOR PENCIL BEAM RADAR

Filed Feb. 1, 1967 4 Sheets-Sheet 1

| TYPE | ACCEPTABLE HIT PATERN | | | |
|---|---|---|---|---|
| 1 | 3 3 | 3<br>3 | 3<br>3 | 3 3 |
| 2 | 1<br>3 2 | 3 1<br>2 | 1<br>2 3 | 2<br>3<br>1 |
| | 1 3 2 | 1<br>3<br>2 | 2 3<br>1 | 2<br>3 1 |
| | 3 2<br>1 | 1 3<br>2 | 2 3 1 | 2<br>1 3 |
| 3 | 2 2<br>2 1 | 2 2<br>1 2 | 2 1<br>2 2 | 1 2<br>2 2 |

INVENTOR.
Norol T. Evans,
BY J. K. Haskell
ATTORNEY.

VIDEO CORRELATOR AND AUTOMATIC DETECTOR FOR PENCIL BEAM RADAR

Filed Feb. 1, 1967

VIDEO CORRELATOR AND AUTOMATIC DETECTOR FOR PENCIL BEAM RADAR
Filed Feb. 1, 1967 4 Sheets-Sheet 3
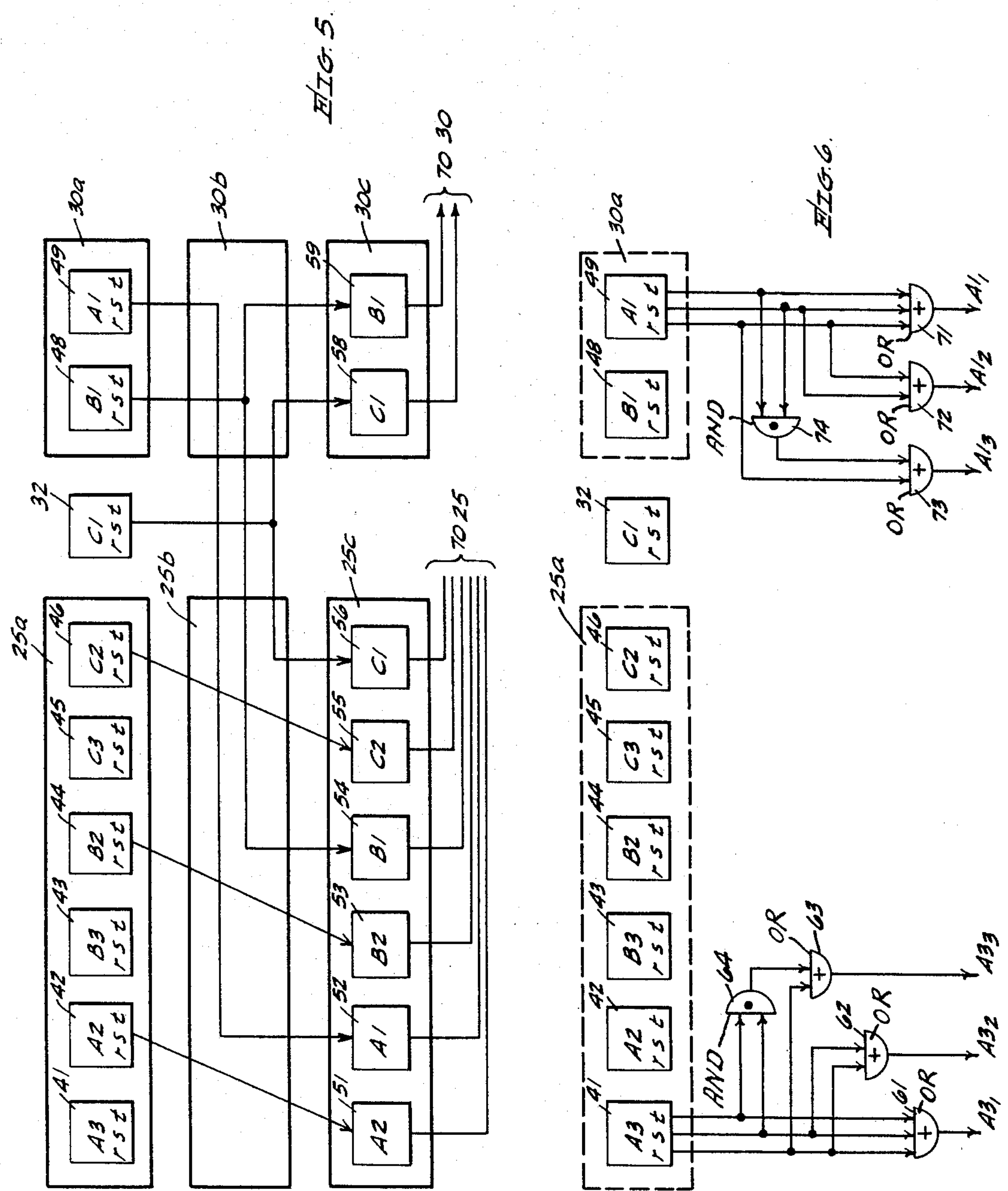

VIDEO CORRELATOR AND AUTOMATIC DETECTOR FOR PENCIL BEAM RADAR
Filed Feb. 1, 1967
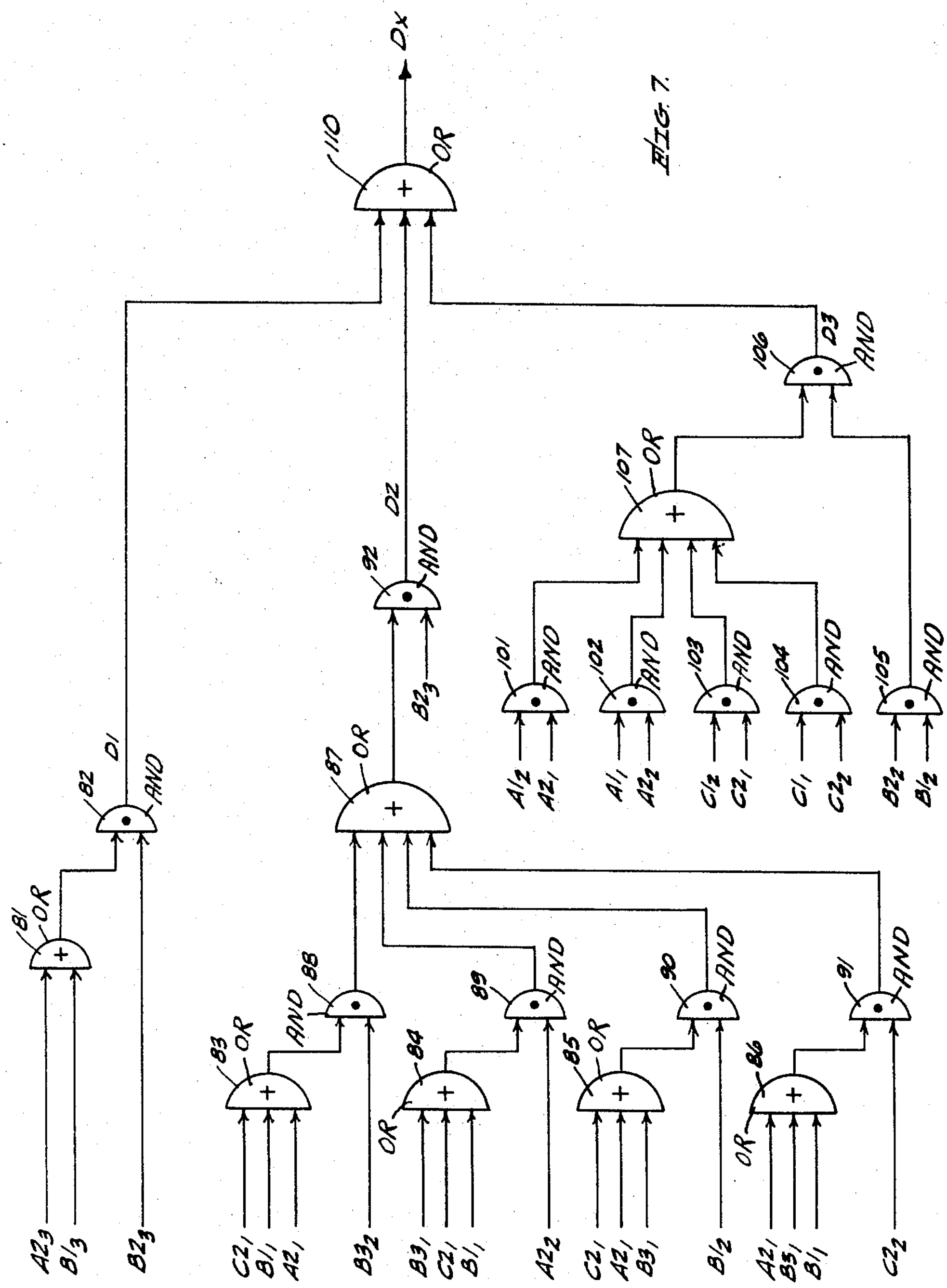

United States Patent Office 3,412,397

Patented Nov. 19, 1968

1

3,412,397

VIDEO CORRELATOR AND AUTOMATIC DETECTOR FOR PENCIL BEAM RADAR

Norol T. Evans, San Pedro, Calif., assignor to Hughes Aircraft Company, Culver City, Calif., a corporation of Delaware Filed Feb. 1, 1967, Ser. No. 613,152
11 Claims. (Cl. 343—5)

ABSTRACT OF THE DISCLOSURE

A video correlator, for use in a pencil beam radar receiving system. The correlator includes, a first memory storing coded video returns from range bins in a plurality of azimuth and elevation positions. A second memory which stores coded video returns from range bins in a plurality of elevations from the same azimuth position. The correlator also includes circuitry controlling the two memories to read out, in real time, the codes from range bins, associicted with a range bin whose coded video returns are being recived. The automatic detector utilizes the readout coded video returns, to automatically determine wherether any of a plurality of code patterns is present, and to provide a target detection signal if any one of such patterns is present.

*Background of the invention*

1. Field of the invention.—This invention relates to a radar processing system and, more particularly, to a video correlator and automatic target detection circuitry finding particular use in a pencil beam radar system.

2. Description of the prior art.—A major problem in automatic detection, acquisition and digital track-while-scan systems is the automatic processing of all the video returns from the surveillance radar. At present, nearly every radar system of any degree of complexity, employs a computer to process the video returns, which are generally digitized or quantized, before being supplied for storage and processing in the computer. Briefly, the video returns from each range interval, also known as a range bin, are digitized to represent the magnitude of the video returns with respect to a selected threshold or skim level. It is the digitized video returns which are processed to determine the presence of meaningful radar targets.

In an automtic track-while-scan radar system, employing a pencil beam, it has ben found that the detection capability greatly increases when employing a beam stacking factor which is greater than one, without a substantial increase in required power. However, with a stack factor of more than one, significant target energy will appear from more than one beam or in more than one range bin. This feature may be utilized to enhance target detection, by integrating or correlating the digitized video which represents target energy, appearing in adjacent range bins.

The task of correlating, however, is not a simple one, since it requires a large data storage capability and, in particular, related circuitry capable of providing, in real time, the digitized video in a plurality of adajcent range bins. This is necessary to be able to correlate, in real time, the digitized video, representing the last received energy with previously digitized video, representing energy received from adjacent range bins. Attempts to provide such capabilities with conventional, prior art circuitry, have not been successful, without extremely complex circuit arrangement and very large data storage means.

2

*Objects and summary of the invention*

It is therefor a primary object of the present invention to provide a new video correlator.

It is another object of the present invention to provide a digital video correlator, finding particular application in a pencil beam radar system.

A further object of the present invention is the provision of a video correlator and an automatic detector, for automatically detecting, in real time, targets scanned by a pencil beam radar system.

Still a further object of the present invention is to provide a novel detector and correlator circuitry, finding particular utility in a pencil beam radar system, for automatically detecting targets, in real time, on the basis of energy, received from a plurality of adjacent radar range sweeps.

Still a further object of the present invention is to provide a detector and a digital video correlator, finding particular application in a pencil beam radar system, for correlating, in real time, and automatically detecting targets on the basis of digital video, stored in related range bins, associated with adjacent range sweeps.

These and other objects of the present invention are achieved by providing a video correlator, incorporating two memories, which are organized to mechanize a moving window detection system. The moving window of the correlator, which is assumed to operate as part of a pencil beam radar system in which a plurality of range sweeps are transmitted sequentially in elevation, as the radar scans in azimuth, moves in range, azimuth and elevation, in real time synchronism with the incoming radar video. During each interval of each range sweep, representing a range bin from which energy is received and quantized, the quantized information from similar range bins from preceding range sweeps are provided by the video correlator in real time. Thus, the incoming quantized video is present in time coincidence with the video made available by the video correlator from the moving window. The available quantized video is then correlated, within the automatic detector, forming a part of the present system. The detector provides an indication of the detection of a target, only when quantized video in a preselected combination of the range bins represented in the moving window are of given magnitudes as will be described hereafter. Otherwise a signal, indicating the absence of the detection of a target is produced.

The novel features that are considered characteristic of this invention are set forth with particularity in the appended claims. The invention will best be understood from the following description when read in connection with the accompanying drawings.

*Brief description of the drawings*

FIGURE 5 is a detailed block diagram of a portion of the circuitry shown in FIGURE 4; and FIGURES 6 and 7 are detailed schematic diagrams of the automatic detector shown in FIGURE 4.

*Description of the preferred embodiments*

In the following, the invention will be described in conjunction with a specific example, presented for explanatory purposes only, rather than as a limitation on the teachings of the present invention.

Figures 1, 3:
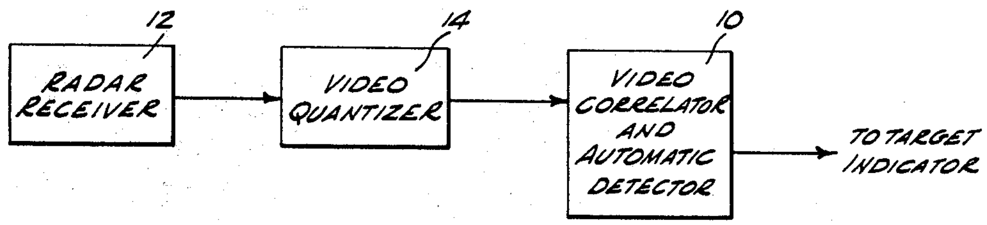
FIGURE 1 is a simplified block diagram, useful in showing the relationship between the present invention and other circuitry in a radar receiving system.
FIGURE 3 is a chart of different types of acceptable hit patterns.

Reference is now made to FIGURE 1 which is a simplified block diagram in which the video correlator and automatic detector of the present invention, designated by numeral 10, is shown connected to a radar receiver 12 through a video quantizer 14, all of which form a part of a radar receiving system, designed to receive video returns from range sweeps which are transmitted in azimuth and elevation to detect the presence of radar targets. For explanatory purposes, it is assumed that ten range sweeps are transmitted sequentially in elevation, beginning at the lowest elevation, as the radar transmitter scans in azimuth, with the cycle being repeated continuously. It is further assumed, that each range sweep of the radar contains four-hundred range bins, each representing the video returns from a different range interval along the radar sweep. For example, a range bin of 3.09 microseconds assumed to be equal to the radar pulse width, corresponds to 500 yards radar so that each range sweep is approximately 100 nautical miles long.

Figure 2:
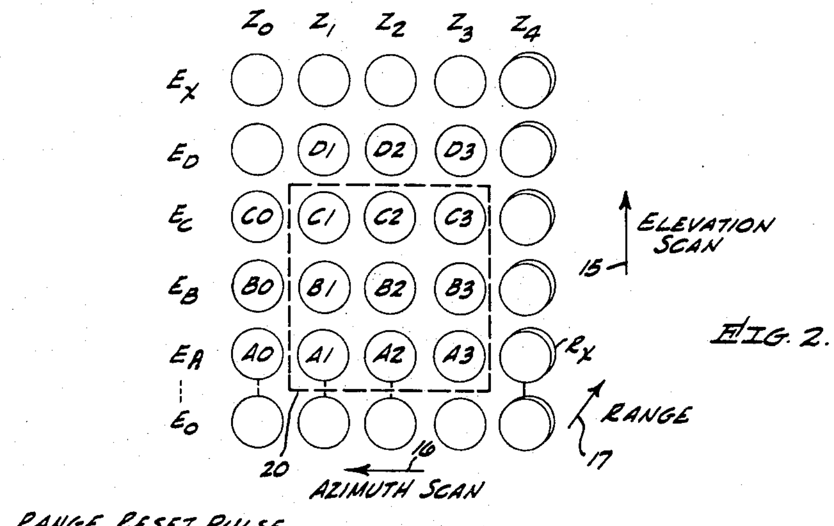
FIGURE 2 is a diagram, useful in explaining the moving detection window system of the present invention.

The beam pattern for a radar system sequentially transmitting range sweeps in elevation, as the radar scans in azimuth, is diagrammed in FIGURE 2 to which reference is made herein. Therein arrows 15, 16 and 17 represent the scan direction, in elevation azimuth and range, respectively. Columns $Z_4$–$Z_0$ represent successive azimuth scan positions, while rows $E_0$–$E_x$ represent different elevation positions in each of the azimuth locations. For explanatory purposes, it is assumed that ten range sweeps are transmitted sequentially in elevation, beginning at the lowest elevation at each azimuth position.

The video received by receiver 12, from each range bin, is quantized by video quantizer 14 into a three bit amplitude code, which is then supplied to the video correlator and automatic detector 10. A typical set of codes used to designate the relative amplitude of the returned video, generally designated by X, with respect to a threshold or skim level, is listed in the following table:

TABLE I

| 3 bit code | Relative Amplitude of Video |
|---|---|
| 0 0 0 | $X < 3$ db |
| 0 0 1 | $3 \leq X < 6$ db |
| 0 1 0 | $6 \leq X < 9$ db |
| 0 1 1 | $9 \leq X < 12$ db |
| 1 0 0 | $11 \leq X < 18$ db |
| 1 0 1 | $18 \leq X < 27$ db |
| 1 1 0 | $27 \leq X < 39$ db |
| 1 1 1 | $39 \leq X$ db |

As seen therefrom, when the received video X is less than 3 db above the threshold level, it is designated by a 3 bit code representing the number 0, as seen from line 1 of the table. Such a number will hereafter be referred to as a 0 code hit. On the other hand, when the return video X is equal or greater than 39 db above the threshold level, a binary number 7 or a 7 code hit is supplied by the quantizer 14, to the video correlator and automatic detector 10. Other relative magnitudes of the return video with respect to the threshold level are designated by binary numbers 1 through 6 as shown in the table. It is the function of video quantizer 14 to convert the return video, received at each range bin from each range sweep into a 3 bit hit number, supplied to the video correlator and automatic detector 10.

As previously indicated, the present invention is particularly useful in a pencil beam radar system, in which it has been found that target detection may greatly be enhanced by integrating or correlating the target energy or return video, appearing in range bins in adjacent range sweeps related to the same range interval. For example, the detection of a target in range bin B2 (see FIGURE 2), representing a selected range interval, designated $R_x$, an azimuth position $Z_2$ and an elevation position $E_B$ need not be a function of only the quantized video received in such range bin; but may also be a function of neighboring range bins, all relating to the same range interval $R_x$. It has been found, that when certain basic energy patterns are present in adjacent range bins, related to the same range interval, the probability of the presence of a target in such a range interval, even in the presence of noise and external interference, is greatly enhanced. Three such basic detection patterns are listed below:

(1) Two hits, at least 9 db above a given threshold level in adjacent azimuth or elevation positions.

(2) Three hits with at least 9 db, 6 db and 3 db amplitudes above the threshold level.

(3) Four hits with three of them at least 6 db and 1 with at least 3 db amplitudes above the threshold level.

Thus, for example, for basic pattern type 1, a target is presumed to be detected in range bin B2 if the quantized video therein and in at least one of the range bins $A_2$, $B_1$, $C_2$, or $B_3$ is at least a binary 3 number or a 3 code hit. It will be recalled that a binary three number or a three code hit indicates that the return video was at least 9 db above the threshold level. For the type 2 pattern, the video in B2 must be a 3 code hit (at least 9 db above the threshold level), while the other 2 hits may be a 2 code hit (at least 6 db) and a 1 code hit (at least 3 db). The other two hits for the type two pattern must occur in range bins either in the same elevation or in the same azimuth, as shown in the second, third and fourth rows of FIGURE 3. For basic detection pattern 3, three code 2 hits and one code 1 hit must be received in adjoining range bins, as shown in the fifth row of FIG. 3.

The various acceptable hit patterns for each of the 3 types of basic detection patterns are diagrammed in FIGURE 3. The numbers 1, 2 and 3, in each acceptable hit pattern designate 1 code hit, 2 code hit, and 3 code hit respectively. In row one, related to type 1 hit patterns, the third and fourth hit patterns (shown by dashed lines) are used in detecting a target during succeeding elevation, and preceding azimuth positions respectively.

From the foregoing it should be appreciated that, before a target can be assumed to be detected at any range bin, quantized video present in the other 8 adjacent bins surrounding the particular range bin must be available. That is, quantized data from a 3 by 3 range bin matrix must be coincidently available, to determine the presence of a target. Thus for example, in the arrangement in FIGURE 2, the presence of target in range bin B2 could only be determined after the quantized video from range bin C1, the last of the range bins in the 3 by 3 matrix surrounded by line 20 is received. Line 20 may be thought of as a window enclosing 9 range bins each having a code, representing quantized video received from the range represented thereby.

It should be pointed out that all the 9 range bins, diagrammed in FIGURE 2 and enclosed by line 20, all are from the same range $R_x$, except that each stores the video returns from the range during a different range sweep. It is the basic function of the video correlator and automatic detector of the present invention, to provide the quantized video from all of the 9 range bins as 3 bit amplitude codes, in real time, as well as to automatically correlate the 9, 3 bit hit code in accordance with the three types of basic detection patterns, hereinbefore described, to determine whether a target is assumed to be detected in the range interval $R_x$ represented by the range bin in the center of the 3 by 3 matrix. Before preceding to describe the video correlator and automatic detector of the present invention in great detail, it should be recalled that each range sweep is divided into four- hundred range bins. In the selected embodiment, by way of illustration at each azimuth position, 10 range sweeps are sequentially transmitted in different elevation positions. Thus, video returns from each azimuth position are stored in 4,000 range bins.

Figure 4:
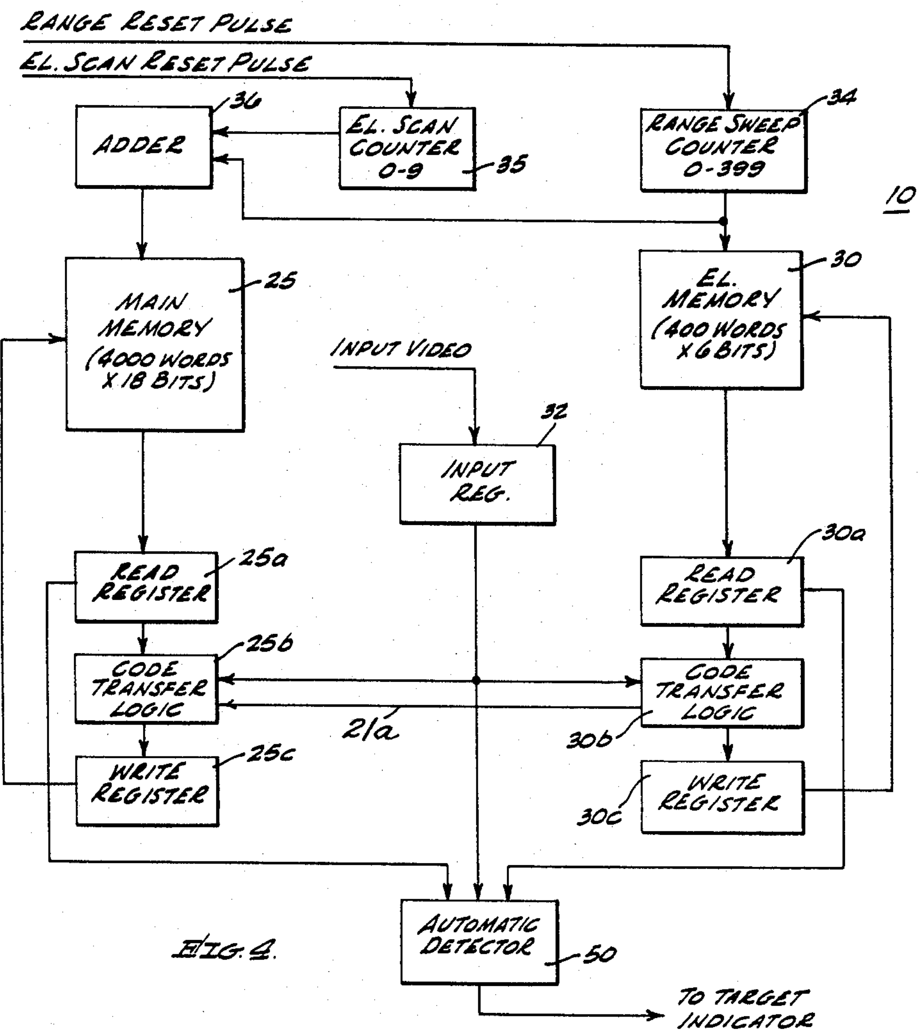
FIGURE 4 is a block diagram of the automatic detector and video correlator of the present invention.

Reference is now made to FIGURE 4 which is a detailed block diagram of the video correlator and automatic detector 10, shown in FIGURE 1. The video correlator portion comprises of a main memory 25 which, for the example used herein, is assumed to have a storage capacity of 4,000 words, each of 18 bits. The correlator also includes an elevation memory 30 of a storage capacity of 400 words, each of 6 bits. Basically, for each one of the 4,000 range bins produced during each azimuth scanning position, the main memory contains an 18 bit word in which the 3 bit hit codes of 6 of the 9 range bins, necessary for target detection are stored. On the other hand, the elevation memory 30 contains a 6 bit word for each of the 400 range intervals into which each range sweep is divided. The last 3 bit hit code for the range bin of the incoming video, is supplied directly through an input register 32, which is assumed to be connected to the video quantizer 14 (FIGURE 1), to receive the 3 bit hit code representing the actual video returns, in real time.

The addressing of memory 30 is controlled by a range sweep counter 34, which counts from 0 to 399, advancing the count during each radar pulse. Thus, each of the 400 words in memory 30 is addressed during each range sweep. On the other hand, the addressing of memory 25 is controlled by an elevation scan counter 35, counting from 0 to 9 the output of which is connected to an adder 36, having another input connected to the output of counter 34. Counter 35 is energized by each elevation scan reset pulse, with adder 36 adding the outputs of counters 34 and 35, so that at each azimuth position, each of the 4,000 words in memory 25 is addressed.

Memory 25 is associated with a read register 25*a*, the output of which is tranferable through a code transfer logic 25*b* to a write register 25*c*. The write register is in turn connected to the main memory 25 to transfer data thereto in a manner to be described hereinafter in detail. Similarly, memory 30 is associated with a read register 30*a*, which is connected through a code transfer logic 30*b* to a write register 30*c*, the output of which is connected to the memory 30. In addition, the code transfer logic 30*b* is connected by a lead 21*a* to transfer logic 25*b* so as to transfer 3 bit hit codes to transfer logic 25*b*. Both code transfer logics 30*b* and 25*b* are connected to receive the output of input register 32.

For a complete explanation of the mode of operation and structure of the novel video correlator, and automatic detector of the present invention, reference is again made to FIGURE 2 and to FIGURES 5 and 6. In FIGURES 5 and 6, the read register 25*a* associated with the main memory 25 is shown comprising of six 3-bit blocks designated 41 through 46, while the read register 30*a* associated with the elevation memory 30 is shown comprising of two 3-bit blocks, designated 48 and 49. Each block is of three bits, the most significant bit, the second most significant bit, and the least significant bit being designated by *r*, *s* and *t* respectively.

In operation, when the quantized video is supplied by the video quantizer 14 (FIGURE 1), to the input register 32, representing the video in range bin C1, at azimuth position $Z_1$ and elevation $E_C$ at the selected range $R_x$, the main memory 25 supplies to the read register 25*a* the 3-bit codes representing the quantized video in related range bins in previously scanned azimuth positions $Z_2$ and $Z_3$, at the same elevation $E_C$ as well as in two lower elevation scans $E_B$ and $E_A$. Thus, when the 3-bit code of C1 is supplied to input register 32, the 3-bit codes of range bins A3, A2, B3 and B2, C3 and C2 are supplied and temporarily stored in blocks 41 through 46 respectively, of the read register 25*a*.

At the same time, the elevation memory 30 transfers to read register 30*a*, the 3-bit codes representing the quantized video in range bins at the azimuth position $Z_1$ of C1, but at two lower elevation scans, i.e. $E_B$ and $E_A$. That is, the 3-bit code of range bin B1 is transferred into block 48, while the 3-bit code of range bin A1 is transferred to block 49 of read register 30*a*. As a result, the 3-bit codes of all the nine range bins forming the window, defined by line 20 in FIGURE 2, are available in time coincidence, and in real time with the arrival of the 3-bit code representing the video of range bin C1.

To determine whether any of the acceptable hit patterns, such as those diagrammed in FIGURE 3, is present in any combination of the nine range bins, the outputs of the blocks 41 through 46 of read register 25*a*, input register 32, and blocks 48 and 49 of read register 30*a*, are supplied to an automatic detector designated by numeral 50 in FIGURE 4, and which is represented in FIGURE 6 by a plurality of gates and by the plurality of gates diagrammed in FIGURE 7 to which reference is made herein.

Briefly, each block of 25*a*, 32 and 30*a* is associated with four gates, interconnected with the *r*, *s*, and *t* outputs of the block in order to provide three output signals which are a function of the 3-bit code in the particular block. For example, in FIGURE 6, block 41 is shown associated with OR gates 61, 62 and 63, and an AND gate 64. Gate 61 responds to the three outputs of block 41, while gate 62 is connected to the *r* and *s* outputs of block 41, representing the most significant and the second most significant bits therein. Block 63, on the other hand, is directly connected to the *r* output of block 41 and to the output of AND gate 64 having two inputs connected to the *s* and *t* outputs of block 41. The outputs of gates 61, 62 and 63 are designated $A3_1$, $A3_2$ and $A3_3$ respectively.

Recalling Table I, charted herebefore, it should be appreciated to those familiar with the art that when at least a 1 hit code is stored in block 41, the output $A3_1$ is true, while the output $A3_2$ is true whenever the hit code in block 41 is at least a 2, representing that the video return is at least equal to or greater than 6 db above the threshold level. On the other hand, the output $A3_3$ is true whenever the 3-bit code in block 41 is at least a 3 hit code, which occurs whenever the video return is at least equal to or greater than 9 db above the threshold level.

Each of the other blocks has a similar gating combination connected therewith. For simplicity however, in FIGURE 6 only the gates associated with blocks 41 and 49 are diagrammed. The gates associated with block 49 are designated by numerals 71, 72, 73 and 74 respectively.

The outputs of the gates associated with each of the blocks is supplied to the gating arrangement, diagrammed in FIGURE 7. Briefly, this gating arrangenemt performs the logic necessary to determine whether any of the acceptable hit patterns is present in the 3 by 3 range bin matrix forming the window as shown in FIGURE 2. For example, to determine whether a type 1 hit pattern is present, gate outputs $A2_3$ and $B1_3$ are supplied to an OR gate 81, the output of which is connected to one input of an AND gate 82, the other input of which is connected to output $B2_3$. Only when range bin B2 temporarily stored in block 44 contains a 3 hit code (FIGURES 5 and 6), and either of range bins $A2_3$ or $B1_3$ temporarily stored in blocks 42 and 48 respectively, also contains a 3 hit code is the output of AND gate 82, designated D1, true, thereby indicating that either one of the two acceptable patterns of type 1 are present in the range bin matrix.

Whether any of the type 2 patterns is present is determined by OR gates 83 through 87 and AND gates 88 through 92. The output of gate 92 designated D2 is true only when one of the type 2 patterns is present. For example, when the first type 2 pattern, diagrammed in FIGURE 3 in row 2 column 1 is present, range bin B2 stores a 3 hit code thereby providing one true input to AND gate 92. Also, OR gate 83 is energized since input $C2_1$ is true and, since at the same time the other input of AND gate 88, i.e. $B3_2$ is true since range bin B3 stores a 2 hit code, the output of AND gate 88 is true. This in turn enables OR gate 87 to provide a true input to AND gate 92. As a result, both inputs of AND and gate 92 are true, thereby enabling the gate to provide a true output D2.

Whether any type 3 hit pattern is present, is automatically determined by AND gates 101 through 106 and OR gate 107. The output of AND gate 106, designated D3 is true only when the hit codes in range bins B2 and B1 are at least two, and two other adjacent range bins store at least a one hit code and a two hit code. The D1, D2, and D3 outputs of AND gates 82, 92 and 106 are connected to three inputs or an OR gate 110, whose output designated $D_X$ is supplied to a target indicator. $D_X$ is true only when any one of the acceptable hit patterns is present, among a selected combination of the nine range bins, forming the window.

From the foregoing, it should thus be appreciated, that in accordance with the teachings of the present invention, by providing, in time coincidence, the 3-bit codes stored in each of the nine range bins forming the window, the logic circuitry incorporated in the automatic detector 50 is capable of automatically determining whether any of the acceptable hit patterns is present to provide a true output whenever such presence is detected. Thus, the energy received in a plurality of adjacent range bins during different range sweeps from the same range interval ($R_x$) is integrated to increase the probability with which a target may be detected.

In addition to providing automatic target detection capabilities, the video correlator of the present invention includes a code transfer arrangement whereby the codes stored in the word received from the main memory 25, and temporarily stored in read register 25*a* is updated for a subsequent read operation. Similarly, the 6 bit word transferred from elevation memory 30 to read register 30*a*, and temporarily stored as B1 and A1 in blocks 48 and 49 is updated for subsequent operation.

For a better explanation of this feature of the invention, reference is again made to FIGURES 2 and 5. Again it should be pointed out that the matrix enclosed in window 20 represents the case in real time, when quantized video is entered into range bin C1 at an azimuth $Z_1$ and elevation $E_C$ from range $R_x$. From the foregoing, it should be appreciated that when this occurs, the main memory transfers a word to the read register which represents the 3-bit codes in range bins C2, C3, B2, B3, A2 and A3 respectively. Thus, it should be appreciated that 4,000 radar clock pulses later, when the video is received for range bin C0 at azimuth position $Z_0$ at the same elevation, i.e. $E_C$ and at the same range, the information that need be read out from the main memory must consist of the 3-bit codes in range bins C1, C2, B1, B2, A1 and A2. This is accomplished by providing within write register 25*c* six 3-bit blocks designated 51 through 56 respectively. The input register 32 is connected through the code transfer logic 25*b*, to block 56 so that the 3-bit code representing C1 may be stored therein, while block 46 of read register 25*a* is connected to block 55 to store the 3-bit code of C2 therein. Similarly, block 54 is connected to block 48 in read register 30*a*, block 53 is connected to block 44, block 52 is connected to block 49, and block 51 is connected to block 42.

During the time that the automatic detector performs the logic operation necessary to determine the presence of any of the acceptable hit patterns, the 3-bit content of blocks 42, 49, 44, 48, 46 and 32 is transferred bit-by-bit into blocks 51 through 56 respectively, to store therein the 3-bit codes representing the quantized video in A2, A1, B2, B1, C2 and C1 respectively. Then, during the write cycle of operation, the content of blocks 51 through 56 is transferred to the same address location in memory 25, to be available for readout into the read register 25*a*, 4,000 radar clock pulses later when, in real time, the quantized video of range bin C0 is supplied to the input register 32. Thus, the mechanization hereinbefore described may be thought of as that consisting of a moving detection window, moving in azimuth from right to left to update the 3-bit codes representing video of six of the range bins necessary for the 3 by 3 range bin matrix.

A similar data updating is performed in the data stored in the elevation memory 30 by means of write register 30*c*. Again referring to FIGURE 2, it is appreciated that when the quantized video of range bin C1 is received, the six bits read out from memory 30 and present in blocks 48 and 49 of read register 30*a* comprise the 3-bit codes of the lower range bins B1 and A1 in the same azimuth position $Z_1$. However, four hundred clock pulses later, when the system is quantizing and receiving the video from range bin D1, one elevation range sweep higher, the necessary information from the memory is the quantized video of range bins C1 and B1.

Such updating is accomplished by connecting block 58 of write register 30*c* (FIGURE 5) to the output of the input register 32, as well as, connecting the input of a block 59 of the same write register to the output of block 48 of read register 30*a*. Thus, whereas during the reception of the video of C1, the memory 30 reads out the video of B1 and A1, the data restored in the same address location is that representing the video of C1 and B1 to be available 400 radar pulses later, for use with the quantized video of range bin D1 and the quantized video from the other six range bins provided by the main memory 25.

The foregoing description of the invention may be summarized as one consisting of a video correlator and automatic detector, designed to provide a target indicating signal on the basis of energy returns in a plurality of interrelated adjacent range bins from the same range interval ($R_x$). In the foregoing example, the presence of a target at a range interval $R_x$ at azimuth position $Z_2$ and elevation $E_B$, i.e. in range bin B2, is determined by integrating the video returns from range bin B2 representing such range interval with the video returns from eight other range bins, all from the same range interval $R_x$, but at different azimuth positions and different elevations. Only when the 3-bit code of range bin B2 and that of the adjacent range bins are in predetermined amplitude relationships and predetermined patterns, is a target indicating signal ($D_x$) produced. That is, only when one of the acceptable hit patterns, such as diagrammed in FIGURE 3 is present, is a target indicating signal produced.

As herebefore explained, the video correlator of the invention includes two memories, which are updated during each range bin period, so that the correlation necessary to produce the target indicating signal may be performed in real time, with the arrival of the quantized video from the last range bin, forming part of the range bin matrix to be correlated. In the foregoing example, a 3 by 3 range bin maxrix has been described. However, it should be appreciated that a larger matrix may be employed. Also, the particular acceptable hit patterns in such a case may be extended to include other acceptable hit patterns, all of which may be implemented by the logic of the automatic detector 50. For example, each of the words in the main memory 25 may store the quantized video of five range bins in each of four preceding azimuth positions. In such a case, each of the words in the memory 25 will consit of 60 bits, for a total storage capacity of 20, 3-bit codes. Similarly, the storage capacity of each of the words in elevation memory 30 will be increased to store four, 3-bit codes, representing the quantized video of range bins in the same azimuth position as that received in real time, but from four preceding elevation positions.

There has accordingly been shown and described herein, a novel video correlator and an automatic detector, finding particular application in a radar receiving system for intergrating energy from a plurality of range bins to increase the target detection capability of the system. Although the invention has been described in conjunction with a specific example, it should be appreciated to those familiar with the art that other arrangements may be employed. Similarly, it should be appreciated that modifications and/or equivalents may be substituted in the arrangements, as shown, without departing from the true spirit of the invention. Therefore, all such modifications and/or equivalents are deemed to fall within the scope of the invention as claimed in the appended claims.

I claim:

1. In a radar system for sequentially transmitting X radar range sweeps in different elevation positions at each of a plurality of related azimuth positions and including means for receiving, during each radar pulse interval, video returns from Y range intervals and means for quantizing the video returns from each range interval into an $n$ bit code, the improvement comprising:

an $n$ bit input register for successively receiving the quantized video return from each range interval in each range sweep;

first means for storing, in XY discrete locations, the quantized video returns from the same range interval received during related adjacent sweeps, wherein each storage location includes a storage capacity of at least $6n$ bits, said $6n$ bits representing quantized video from the same range interval from which the quantized video in said input register is received but from two preceding azimuth positions and in preselected elevation positions with respect thereto;

second means for controlling said first means to provide the quantized video stored in a discrete location when said input register receives the quantized video from the same range interval in an adjacent range sweep; and third means responsive to said input register and to the quantized video provided by said first means for correlating the quantized video in real time to provide a target detection signal only when any one of a group of preselected quantized video relationships exist between the quantized video from said input register and said first means.

2. The improvement as recited in claim 1 further including means for updating the bits stored in each of said XY discrete locations, for use with subsequently received $n$ bit quantized video from each of XY range intervals in succeeding azimuth positions.

3. In a radar system of the type in which X radar range sweeps are transmitted sequentially in elevation at each of a sequence of azimuth positions each range sweep being transmitted over a distance comprising Y range intervals, a radar receiver for successively receiving video returns from each of the range intervals and a video quantizer for quantizing the video returns from each range interval into an $n$ bit code, the numerical value of which represents the relative amplitude of the video with respect to a predetermined threshold level, the improvement comprising:

an input register for sequentially receiving each of the XY $n$ bit codes provided by said quantizer during the X range sweeps transmitted at each azimuth position;

a first memory of XY storage words each of $kn$ bits, each word storing for each range interval in each of the X range sweeps in each azimuth position, $kn$ bit codes, representing the quantized video from the same range received during $p$ preceding azimuth positions;

a second memory of Y storage words, each of $$n\left(\frac{k}{p}-1\right)$$

bits, each word storing for each range interval in a range sweep $$\frac{k}{p}-1$$

$n$ bit codes representing the quantized video from the same range in the same azimuth, received during $$\frac{k}{p}-1$$

preceding elevation positions;

control means for controlling said first memory to read out in real time one of said words which is related to the particular range interval from which quantized video as an $n$ bit code is supplied to said input register, said control means further controlling said second memory to readout in real time, the word associated with said particular range interval; and automatic detection means for correlating the $n$ bit code from said input register with the $k$, $n$ bit codes from said first memory and the $$\frac{k}{p}-1$$

$n$ bit codes from said second memory to provide an output signal of a first level only when the numerical value of the $n$ bit code from said input register and the numerical values of the $n$ bit codes from said first and second memories are of predetermined values in any one of a plurality of predetermined relationships.

4. The improvement as recited in claim 3 wherein said automatic detection means correlate $n$ bit codes from $(k/p)^2$ range interval, defining a video correlation window, said improvement including means for updating the $n$ bit codes stored in said first and second memories.

5. In combination with a system for sequentially transmitting energy along a first dimension, at discrete positions in second and third dimensions, said system including means for receiving a portion of the energy reflected from objects located at each of a plurality of range intervals along the first dimension, and for producing received signals representative of the relative value of said received energy, a correlation system comprising:

storage means for storing said received signals as a function of the location of said objects in the first, second and third dimensions;

read out means, coupled to said storage means, for simultaneously retrieving the stored received signals associated with objects located at a selected one of said plurality of range intervals and within a selected one of a plurality of areas in said second and third dimensions; and correlation means coupled to said read out means for correlating said retrieved signals so as to provide a detection signal when the relative value, and location in said second and third dimensions, of said retrieved signals correspond to one of a preselected group of value-location relationships.

6. The combination of claim 5 wherein said correlation means includes first detector means for providing a detection signal when two retrieved signals, having values equal to at least a first value, are adjacently located within said selected area.

7. The combination of claim 6 wherein said correlation means further includes second detector means for providing a detection signal when the value of the sum of three adjacent retrieved signals within said selected area at least equals a second value.

8. The combination of claim 7 wherein said correlation means further includes a third detector means for providing a detection signal when the sum of the values of four adjacent retrieved signals within said selected area is at least equal to a third value.

9. The combination of claim 6 wherein said correlation means further includes second detector means for providing a detection signal when the sum of the values of four adjacent retrieved signals within said selected area is at least equal to a second value.

10. The combination of claim 5 wherein said correlation means includes a first detector means for providing a detection signal when three retrieved signals, having values totalling at least a first value, are adjacently located within said selected area.

11. The combination of claim 5 wherein said correlation means includes a first detector means for providing a detection signal when four retrieved signals, the sum of which at least equals a first value, are adjacently located within said selected area.

References Cited

UNITED STATES PATENTS 3,312,969 4/1967 Halsted ______________ 343—5

RODNEY D. BENNETT, *Primary Examiner.*

T. H. TUBBESING, *Assistant Examiner.*